Patented Apr. 15, 1952

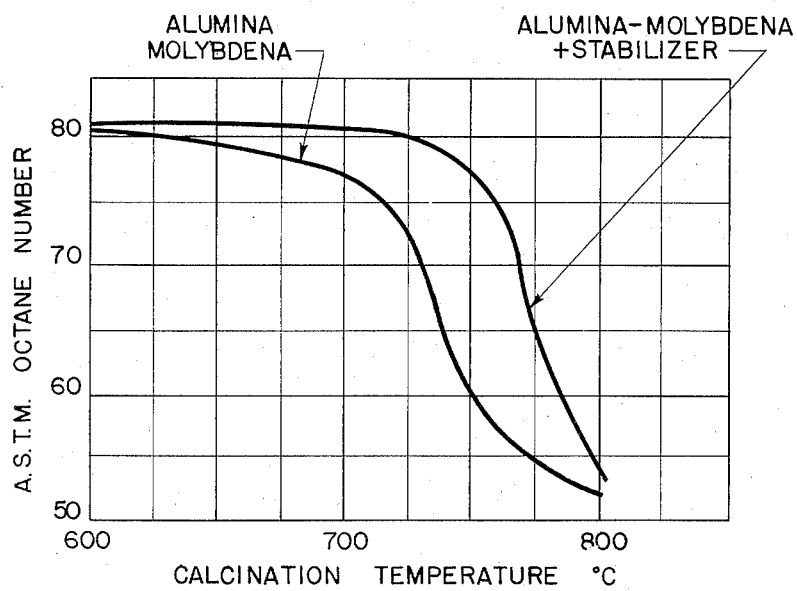

2,592,765

UNITED STATES PATENT OFFICE 2,592,765

DEHYDROGENATION OF HYDROCARBONS

Charles L. Thomas, Winnetka, Ill., and Jacque C. Morrell, Chevy Chase, Md., assignors to Universal Oil Products Company, Chicago, Ill., a corporation of Delaware Original application May 26, 1943, Serial No. 488,500. Divided and this application May 21, 1948, Serial No. 28,536

10 Claims. (Cl. 260—673.5)

This application is a division of our co-pending application Serial No. 488,500 filed May 26, 1943, now Patent No. 2,444,965, which in turn is a continuation-in-part of our application Serial No. 404,374 filed July 28, 1941.

This invention relates to a method of reforming a low antiknock gasoline or gasoline fraction to improve its antiknock value.

More specifically, it is concerned with a process involving the use of special catalysts and specific conditions of operation in regard to temperature and pressure whereby a low antiknock gasoline or gasoline fraction can be efficiently converted to a gasoline possessing a higher antiknock value.

It is generally known that it is possible to produce a substantial increase in the antiknock value of a low octane gasoline by subjecting said gasoline to a thermal reforming process under specific conditions of temperature, pressure, and reaction time. The gasoline produced by this process ordinarily has an octane number within the range of about 68 to 72 with a satisfactory liquid recovery. However, if a higher octane number is desired, it is necessary to use more severe processing conditions, and under these conditions a greater loss in liquid yield results due to the formation of a considerable amount of light hydrocarbon bases and heavy liquid polymers. Because of the complexity of the hydrocarbon mixtures being treated and the multiplicity of the reactions occurring, it is difficult to control the processing conditions so that the desired reactions will predominate.

In recent years, there have been many catalysts proposed for the catalytic reforming of low antiknock gasoline. There are many difficulties attending the use of these proposed catalysts. One of the chief difficulties has been the fact that after the catalyst has been in contact with the hydrocarbon reactants for a short period, the activity of the catalyst decreases due to the deposition of carbonaceous materials on the surface of the catalyst which makes it necessary to periodically regenerate the catalyst. This regeneration is ordinarily accomplished by the combustion of the carbonaceous materials by air or other oxygen-containing gases. This means considerable expenditure for compressors and other auxiliary equipment and greatly increases the operating cost of the unit, thereby considerably increasing the cost of producing a high antiknock fuel.

The present invention discloses a group of catalysts which when used under specific conditions of operation will catalyze the desired reactions to produce a substantial increase in antiknock value with a satisfactory liquid recovery and a low carbon deposition.

The catalysts disclosed in this invention are composite materials comprising in general minor proportions of a relatively inert refractory material of the type hereinafter indicated, major proportions of purified alumina, and minor proportions of metallic oxides possessing dehydrogenating and cyclicizing properties selected from the oxides of the metals in the left hand column of groups V and VI of the periodic table.

These catalysts are not only adaptable to the reforming of a low antiknock gasoline but are also particularly effective in a process wherein individual hydrocarbons are dehydrogenated and cyclicized.

The relatively inert refractory materials employed in the catalysts, according to the invention, are usually natural-occurring materials of the kaolin group, such as kaolinite, and montmorillonite. Ordinarily these materials are sufficiently pure in their natural-occurring state that they can be used without any further treatment. However, there may be some deposits containing considerable quantities of iron compounds which should be removed by some treatment such as the use of acids before compositing the materials with the other constituents of the catalyst.

The alumina used in the composite catalyst is preferably prepared by precipitating the hydroxide from a solution of aluminum salt, and the dehydration of the precipitate of aluminum hydroxide by heat. However, there are oxides of aluminum occurring naturally which can be used in manufacturing the catalyst. Bauxite for example when composited with the inert refractory material and the highly active metallic oxide forms a very satisfactory catalyst. Care must be taken, however, that substantial amounts of impurities such as iron compounds are not present in the bauxite, since such materials tend to decrease the efficiency of the catalyst.

The highly active synthetic constituents of the catalyst may comprise in general the compounds of the elements of the left-hand column of groups V and VI of the periodic table. Practically all of the compounds of these elements have some catalytic activity, but it has been found that the oxides, particularly the lower oxides of such elements as chromium, vanadium and molybdenum, form the most active catalysts.

There are various methods by which the composite catalyst may be formed. Three illustrative methods are given below, but it must be understood that the recitation of these methods does not place any undue limitations on this invention, since there are various methods or modifications which fall under its scope.

(1) The relatively inert refractory material may be suspended in a solution containing aluminum chloride and chromium chloride (or equivalents) and a basic precipitant added. The resulting solid suspension is then filtered, dried, and calcined to produce the composite catalyst.

(2) The alumina may be deposited on the inert refractory material, the resulting mixture dried and then impregnated with a compound yielding the more active oxide, and the final mixture calcined.

(3) The relatively inert refractory material and/or the alumina may be peptized by the addition of some acid before compositing said materials with a compound yielding the highly active oxide by any of the above methods.

The resulting composite catalysts are dried at a temperature within the range of 225 to 300° F. for approximately 1 to 6 hours after which they may be formed into particles of a suitable size by pilling, briquetting or extrusion. One outstanding advantage of this particular type of catalyst is the fact that it is very easily shaped into the desirable forms, particularly by extrusion. Since the formation of catalyst shapes by extrusion is a comparatively inexpensive process, this advantage is very important and will considerably decrease the catalyst cost in the dehydrogenating or reforming operation. It is ordinarily desirable to form the catalyst particles by extrusion prior to the drying operation. The extruded catalyst is then dried under the usual conditions. After the drying operation is completed the catalyst particles are calcined at a temperature within the range of approximately 850 to 1300° F. to reduce the water content to one of the order of 1 to 2%.

The proportions of the various constituents in the composite catalyst will vary depending upon the particular materials being used as supports and promoters, but will ordinarily be within the following ranges: Refractory material from 5 to 30%, purified alumina 50 to 90%, and highly active metallic oxide constituent 4 to 20%.

The catalysts prepared by the above general procedure are distinguished by an unusually high stability and a large contact surface, the pores being of such size that the hydrocarbon vapors are seemingly able to penetrate to a considerable distance and will retain the structure after many alternate processing and reactivating cycles.

The present invention entails the use of the catalysts prepared by the general procedure described above in reforming reactions when employed as packing material in tubes or chambers in the form of small pellets or granules.

The general procedure in reforming involves contacting the heated gasoline fraction with the catalyst followed by the usual fractionation and stabilization operation to separate the small quantities of heavy polymers and light gases formed.

The processing temperatures will depend upon the particular catalyst being used but will ordinarily be within the range of 750 to 1100° F. In general, pressures of the order of substantially atmospheric up to 400 pounds superatmospheric are satisfactory. In case hydrogen or hydrogen-containing gases such as the gases removed in the stabilization operation are recirculated back to the reaction zone, operating pressures nearer the higher limit will be used.

The following example illustrates the results obtainable when using a catalyst included within the broad scope of this invention.

*Example I*

The catalyst was prepared in the following manner: Eighty pounds of alumina trihydrate and 15 pounds of kaolin were mixed with 16 liters of a $MoO_3$ solution containing 14 pounds of $MoO_3$ in a 10% $NH_3$ solution and with 4 liters of acetic acid. The ingredients were thoroughly mixed for one hour. The composite materials were removed from the mixer and extruded to form 1/8" diameter pellets. The pellets were dried at 320° F. for about 8 hours and activated for 3 hours at 1200° F. The activation treatment was very carefully conducted. The temperature was increased slowly from 320 to 1200° F. with 50° F. increment increases about every 15 minutes.

A measured volume of the 1/8" pellets was charged into a reactor and contacted at a temperature of 970° F. under a pressure of 200 pounds per square inch gauge at a liquid hourly charge rate corresponding to a space velocity of 0.50 with the vapors of a 61.7° A. P. I. gravity Michigan straight-run gasoline having an octane number of 24. Four mols of light hydrocarbon gases were recirculated from the gas collecting equipment into the reaction zone per mol of gasoline charged to the plant. The resulting gasoline had a 56° A. P. I. gravity, 72.5 octane number, and a 9.8 pound Reid vapor pressure. The liquid recovery amounted to 85.0 of the original charging stock. The catalyst coke formed during a 6 hour processing cycle amounted to only 0.8% by weight of the charge.

*Example II*

A catalyst was prepared by mixing 817 grams of alumina trihydrate with 250 cc.'s of ammonium molybdate and after mixing, 60 grams of an acid-treated montmorillonite clay were added followed by further mixing to produce a uniform slurry. This prepared material was partially dried and extruded to form catalyst particles. The catalyst particles were then dried at 300° F. to remove water.

Another catalyst was manufactured by the same method with the exception that the montmorillonite clay was excluded from the constituents going into the manufacture of the catalyst. Portions of each of the two catalysts were then calcined in muffle furnaces at temperatures of 1100°, 1300°, 1400° and 1575° F. for periods of 6 hours. After the calcining treatment, the catalysts were examined to determine the weight of molybdenum trioxide, bulk density and crystal structure of samples of catalysts calcined at the various temperatures. The effects of the calcinations at varying temperatures are indicated by the data included in the following table.

In this table, catalyst A consists solely of alumina and molybdena while catalyst B consists of alumina, molybdena and montmorillonite clay.

| Catalyst | Temp. of Calcination °C. | Per cent $MoO_3$ | Apparent Bulk Density | Crystal Structure |
| --- | --- | --- | --- | --- |
| A | 1100 | 9.57 | 0.87 | $\gamma$-$Al_2O_3$. |
|   | 1300 | 9.5  | 1.00 | $\gamma$-$Al_2O_3$. |
|   | 1400 | 9.5  | 1.13 | Molybdena-Alumina Complex. |
|   | 1575 | 9.16 | 1.23 | More Crystal Development at 800° C., No $\alpha$-$Al_2O_3$. |
| B | 1100 | 10.2 | 0.85 | $\gamma$-$Al_2O_3$. |
|   | 1300 | 10.0 | 0.88 | $\gamma$-$Al_2O_3$. |
|   | 1400 | 10.0 | 0.92 | $\gamma$-$Al_2O_3$. |
|   | 1575 | 9.88 | 1.07 | Molybdena-Alumina Complex Plus Another Crystal Growth, Possibly Mullite or Sillimanite. |

Both catalysts show good stability after calcination up to temperatures of 1100° F. since the base alumina retained its gamma-alumina structure. However, during the heating at 1400° F. and at 1575° F., the catalyst underwent changes which were not the same for catalyst A and catalyst B. The alumina-molybdena catalyst without montmorillonite clay after heating at 1400° F. contained a considerable amount of a crystalline substance which is probably a complex material containing both alumina and molybdena, since the X-ray pattern did not correspond to alpha alumina or any of the other patterns known for pure alumina in its transition from the gamma to the alpha form. The appearance of this complex in catalyst A and the absence of the complex in catalyst B under the same heat treatment is indicative of the increased thermal stability of the catalyst containing montmorillonite clay.

To further compare the effect of calcination at different temperatures on the alumina-molybdena catalyst containing the montmorillonite clay, these catalysts after the calcination were tested in the hydroforming of a 36.5 octane number Mid-Continent naphtha, the vapors of which were mixed with 3 mols of hydrogen per mol of naphtha and passed in comparative tests over equal volumes of the catalyst at an hourly liquid space velocity of 0.5, a temperature of 960° F. under substantially atmospheric pressure for about 6 hours. The results obtained in respect to the octane numbers of the hydroformed gasolines are shown in the accompanying drawing. This drawing indicates that the hydroforming activity of the catalyst containing only alumina and molybdena began to decline rapidly after a calcination temperature of 1300° F. had been employed whereas the corresponding drop in activity of the catalyst containing montmorillonite clay occurred only after calcination at 1400° F.

We claim as our invention:

1. A process for dehydrogenating a dehydrogenatable hydrocarbon which comprises contacting said hydrocarbon under dehydrogenation conditions with a composite dehydrogenation catalyst comprising from 50 to 90% of aluminum oxide, from 5% to 30% of a clay selected from the group consisting of kaolin and montmorillonite, and from 4% to 20% of an oxide of a metal selected from the elements in the left-hand columns of groups V and VI of the periodic table.

2. A process for dehydrogenating a dehydrogenatable hydrocarbon which comprises contacting said hydrocarbon under dehydrogenation conditions with a composite dehydrogenation catalyst comprising from 50 to 90% of aluminum oxide, from 5% to 30% of a clay selected from the group consisting of kaolin and montmorillonite, and from 4-20% of chromium oxide.

3. A process for dehydrogenating a dehydrogenatable hydrocarbon which comprises contacting said hydrocarbon under dehydrogenation conditions with a composite dehydrogenation catalyst comprising from 50 to 90% of aluminum oxide, from 5% to 30% of a clay selected from the group consisting of kaolin and montmorillonite, and from 4% to 20% molybdenum oxide.

4. The process of claim 1 further characterized in that said clay comprises acid treated montmorillonite clay.

5. A process for the improvement of the antiknock value of a straight run gasoline which comprises subjecting the heated vapors of said gasoline to contact under reforming conditions with a composite dehydrogenation catalyst comprising from 50 to 90% of aluminum oxide, from 5% to 30% of a clay selected from the group consisting of kaolin and montmorillonite, and from 4% to 20% of an oxide of a metal selected from the elements in the left-hand columns of groups V and VI of the periodic table.

6. A process for the improvement of the antiknock value of a straight run gasoline which comprises subjecting the heated vapors of said gasoline to contact under reforming conditions with a composite dehydrogenation catalyst comprising from 50 to 90% of aluminum oxide, from 5% to 30% of a clay selected from the group consisting of kaolin and montmorillonite, and from 4% to 20% of molybdenum oxide.

7. The process of claim 6 further characterized in that said clay comprises acid treated montmorillonite clay.

8. A process for the production of aromatic hydrocarbons from aliphatic hydrocarbons containing from 6 to 12 carbon atoms per molecule which comprises subjecting the heated vapors of said aliphatic hydrocarbons to contact under dehydrocyclization conditions with a composite dehydrogenation catalyst comprising from 50 to 90% of aluminum oxide, from 5% to 30% of a clay selected from the group consisting of kaolin and montmorillonite, and from 4% to 20% of an oxide of a metal selected from the elements in the left-hand columns of groups V and VI of the periodic table.

9. A process for the production of aromatic hydrocarbons from aliphatic hydrocarbons containing from 6 to 12 carbon atoms per molecule which comprises subjecting the heated vapors of said aliphatic hydrocarbons to contact under dehydrocyclization conditions with a composite dehydrogenation catalyst comprising from 50 to 90% of aluminum oxide, from 5% to 30% of a clay selected from the group consisting of kaolin and montmorillonite, and from 4% to 20% of molybdenum oxide.

10. The process of claim 9 further characterized in that said clay comprises acid treated montmorillonite clay.

CHARLES L. THOMAS.
JACQUE C. MORRELL.

REFERENCES CITED

The following references are of record in the file of this patent:

UNITED STATES PATENTS

| Number | Name | Date |
|--------|------|------|
| 2,202,401 | Rosen | May 28, 1940 |
| 2,217,865 | Groll et al. | Oct. 15, 1940 |
| 2,245,733 | Subkow | June 17, 1941 |
| 2,249,337 | Visser et al. | July 15, 1941 |
| 2,289,716 | Marschner | July 14, 1942 |